United States Patent
Moore et al.

(10) Patent No.: US 8,233,199 B2
(45) Date of Patent: Jul. 31, 2012

(54) DOCUMENT PRESENTMENT APPARATUS FOR USE IN LINEAR DOCUMENT READER

(75) Inventors: Michael J. Moore, Beverly Hills, MI (US); John Gudenburr, Canton, MI (US); Sammy C. Hutson, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1096 days.

(21) Appl. No.: 12/110,395

(22) Filed: Apr. 28, 2008

(65) Prior Publication Data
US 2009/0268262 A1 Oct. 29, 2009

(51) Int. Cl.
*H04N 1/04* (2006.01)
*H04N 1/46* (2006.01)

(52) U.S. Cl. ........................................ 358/474; 358/505

(58) Field of Classification Search .................. 358/474, 358/501, 1.1
See application file for complete search history.

(56) References Cited

U.S. PATENT DOCUMENTS 5,402,156 A * 3/1995 Donahue et al. .......... 346/139 D
7,280,684 B2 * 10/2007 Blair et al. .................... 382/139

* cited by examiner

*Primary Examiner* — Douglas Tran
(74) *Attorney, Agent, or Firm* — Honigman Miller Schwartz and Cohn LLP (57) ABSTRACT

A document scanner is disclosed. The document scanner includes a document bed having a surface to position a document. The document bed includes a slot in which a presentment apparatus is positioned. The presentment apparatus includes a first rigid layers a second compressible layer, and a third lower friction layer. A method of use of the document scanner is disclosed as well.

19 Claims, 7 Drawing Sheets

DOCUMENT PRESENTMENT APPARATUS FOR USE IN LINEAR DOCUMENT READER

TECHNICAL FIELD

The present disclosure relates to a document presentment apparatus. More particularly, the present disclosure relates to a document presentment apparatus for a document reader, such as a check scanning device.

BACKGROUND

A transfer of finds can lag a business transaction, such as a purchase, by many days if a check or other negotiable instrument is used. This is because routing information must be read and processed, and the document must be transferred to a bank for funds to be exchanged. This time lag, or "float", represents a substantial amount of time after transactions occur in which funds may accrue interest. It is therefore advantageous, to companies or institutions accepting checks as a form of payment, to process those checks as soon as possible after a transaction occurs.

It can be advantageous to electronically read routing information on checks and also to scan checks or other documents representing a purchase in such a scenario. Magnetic ink character recognition (MICR) is commonly used to read information embedded in checks and other documents. MICR has been used for quite some time in a variety of machines and devices. Machines in use presently perform document reads by passing a document down a document track and past a fixed MICR read head.

Those with skill in the art recognize the need for proper presentment and "wrap" of the document as it is passed over, or around, the read head. "Wrap" refers to how the document conforms around the MICR read head. A better wrap increases the accuracy of the MICR read head's character recognition. The proper wrap is further explained in U.S. Pat. No. 6,394,348.

To achieve adequate document wrap, existing solutions implement rollers, belts, springs, pressure pads and other devices to present the check to the read head. Machines implementing these devices only achieve proper presentment and wrap by moving the documents past a static MICR read head. These machines are referred to as dynamic devices, because the documents are in motion. Dynamic devices are large and costly. Dynamic devices require skilled technicians for repair and replacement if parts become worn or damaged.

Alternatively, a static solution can be used, where the document itself is static and the MICR read head is moved across the static document. Like dynamic devices, static devices require proper presentment and wrap to achieve adequate character recognition rates. Typically, static devices are not able to achieve proper presentment, resulting in misreads and non-reads. Lower recognition rates based on misreads and non-reads are costly to the banks and retail users of these static machines.

Therefore, improvements are desirable.

SUMMARY

In accordance with the present disclosure, the above and other problems are solved by the following:

In a first aspect, a document scanner is disclosed. The document scanner includes a document bed having a surface for positioning a document. The document bed has a slot in which a presentment apparatus is inserted. The presentment apparatus is compressible. The document scanner also includes a scanner module arranged and configured to pass over the document bed to scan the document. The scanner module includes a read head. When the scanner module passes over the document, the presentment apparatus compresses, causing the document to wrap around the read head.

In a second aspect, a document bed is disclosed. The document bed includes a surface for positioning a document to be scanned. The surface has a slot for receiving a presentment apparatus. The presentment apparatus includes a first rigid layer, a second compressible layer, and a third lower friction layer.

In a third aspect, a method of using a document scanner is disclosed. The method applies to a document scanner having a document bed including a surface for positioning a document and a slot in the surface for receiving a presentment apparatus that is compressible. Further, there is a scanner module, including a read head, arranged and configured to pass over the document bed to scan the document. As the scanner module passes over the document, the presentment apparatus compresses, causing the document to wrap around the read head. The method comprises placing a document on the document scanner and compressing the presentment apparatus by moving the scanner module over the document bed.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a document presentment apparatus used with a static document reader, providing proper presentment and wrap of a document to a read head. The document presentment apparatus is comprised of a compressible material that maintains a repeatable height. The document presentment apparatus may further comprise a low friction material on its surface, so that a read head can easily pass over it. In usage, a document is placed on top of the document presentment apparatus, which is deformed as a document reader passes over the surface of the document.

The document presentment apparatus described herein is useable in low-cost electronic document readers placed at locations for commercial transactions, such as restaurants, supermarkets, or other commercial businesses. The static document reader itself provides a low-cost solution that allows businesses to capture check information for immediate transmittal to financial institutions. This reduces the time required to reliably communicate check information to financial institutions and also reduces the time required to complete funds transfer.

The document presentment apparatus described in the present disclosure provides a simple and cost effective method of obtaining proper presentment and wrap of documents to read heads in static document readers. By document reader, it is intended that any of a number of types of document scanning devices are incorporated, which can capture image or text data of a printed document for electronic storage and transmission.

Figure 1:
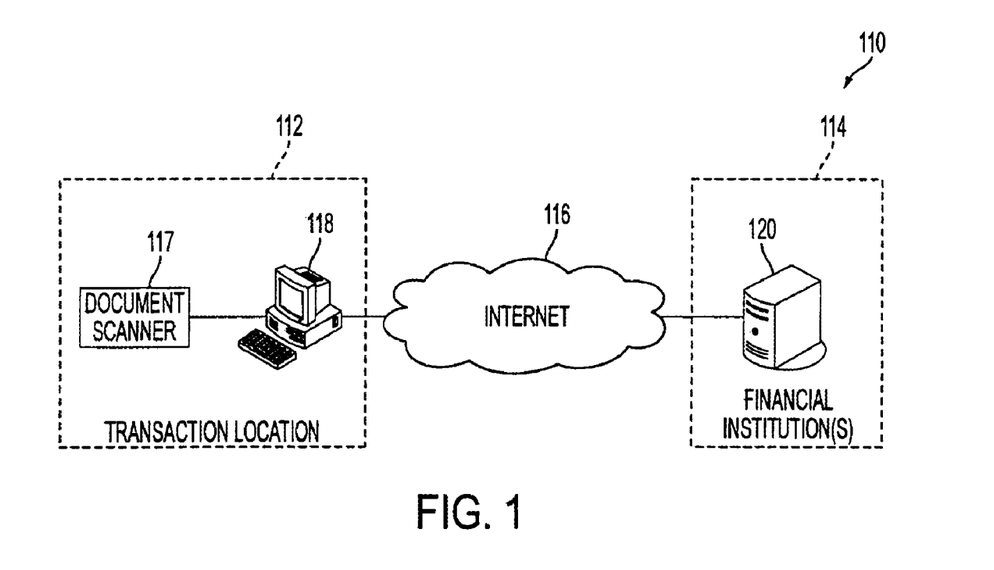
FIG. 1 is a schematic depiction of a network in which an electronic financial transaction may be placed, in accordance with the present disclosure.

One specific example of a system incorporating a document reader or scanner having the disclosed document presentment apparatus is shown in FIG. 1. FIG. 1 illustrates a schematic view of a network 110 in which a financial transaction may take place, according to a possible embodiment of the present disclosure. The network 110 generally includes one or more transaction locations 112 and financial institutions 114, communicatively connected by a network, which may be an internet connection 116. A transaction location 112 may be any of a number of places of business at which a financial transaction may take place, such as for purchase or sale of goods and services. Example transaction locations may include restaurants, supermarkets, or other places of business. Each transaction location includes a document scanner 117 interconnected with a computing system 118. The document scanner 117 is arranged to provide the transaction location with the ability to electronically acquire information about a printed document such as a check used for payment in exchange for goods and/or services. In certain embodiments, the document scanner 117 can be a check scanner, which is sized and designed to be a low cost solution to read account information on personal checks and scan images of one or both sides of the check. An example document scanner useable in the network 110 is described below in conjunction with FIGS. 3-6.

The computing system 118 can be any of a number of types of computing systems, such as a general purpose personal computer, or a specialized computer such as a cash register or inventory system. The computing system 118 can interconnect with the document scanner 117 by any of a number of standard or specialized communication interfaces, such as a USB, 802.11a/b/g network, RF, infrared, serial, or other data connection. In certain embodiments, the computing system 118 runs an application configured to control the document scanner 117; in further embodiments, the computing system receives data from the document scanner and stores and/or communicates the data (images, text, or other information) to other systems to which it is interconnected.

Each of the financial institutions 114 generally includes a computing system 120, which is configured to receive electronic records of financial transactions relevant to the financial institutions. The computing system 120 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 110 as well.

The internet connection 116 depicted can be any of a number of WAN, LAN, or other packet based communication networks such that data can be shared among a number of computing systems or other networked devices. Furthermore, although in the embodiment shown two computing devices 118, 120 at different, specific locations are depicted, the computing devices and/or the document scanner 117 may be located at the same location or within the same network.

Figure 2:
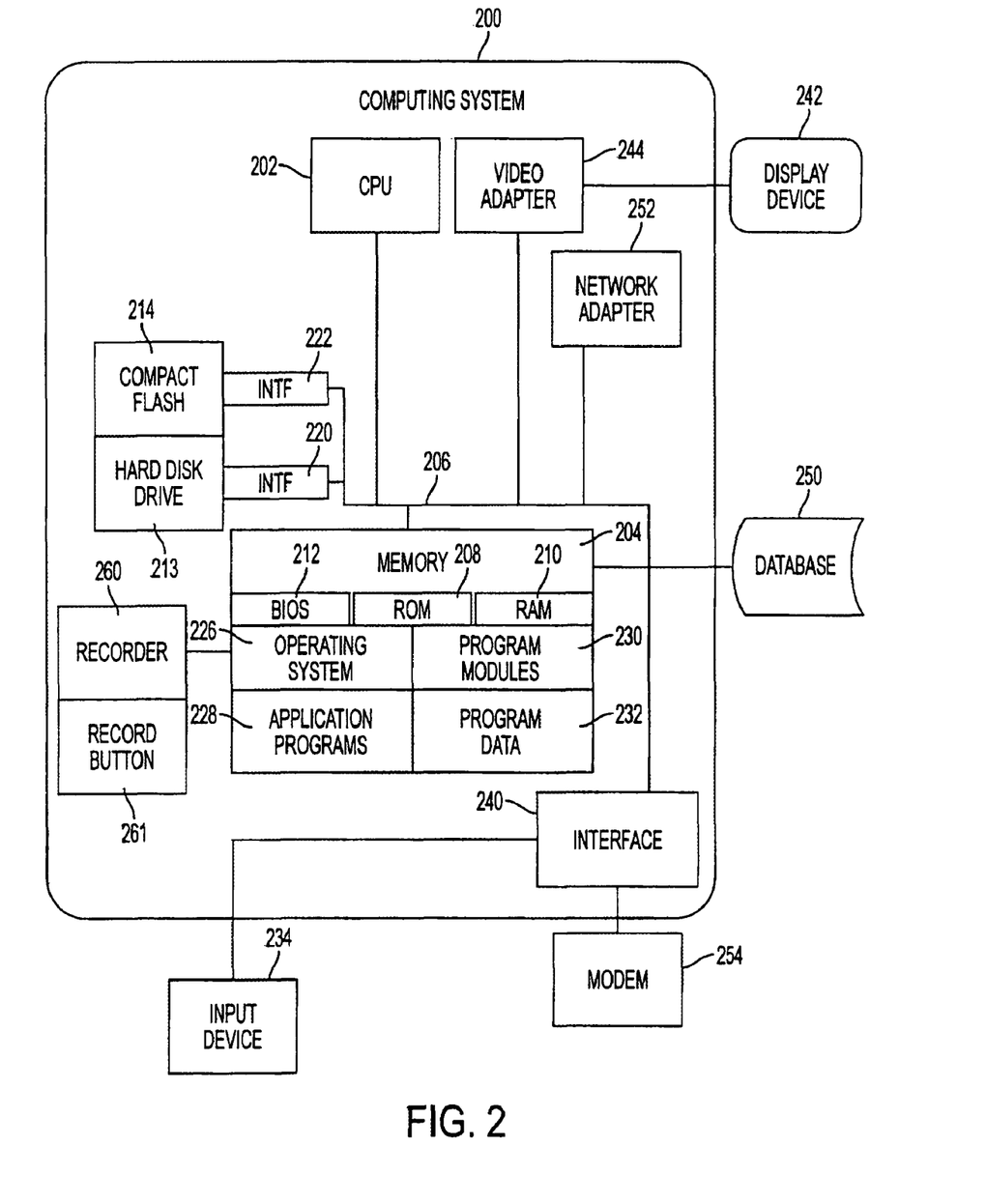
FIG. 2 shows a schematic representation of a computing system that may be used to implement aspects of the present disclosure.

Referring now to FIG. 2, an exemplary environment for implementing embodiments of the present disclosure includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start up, is typically stored in the ROM 208.

Preferably, the computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
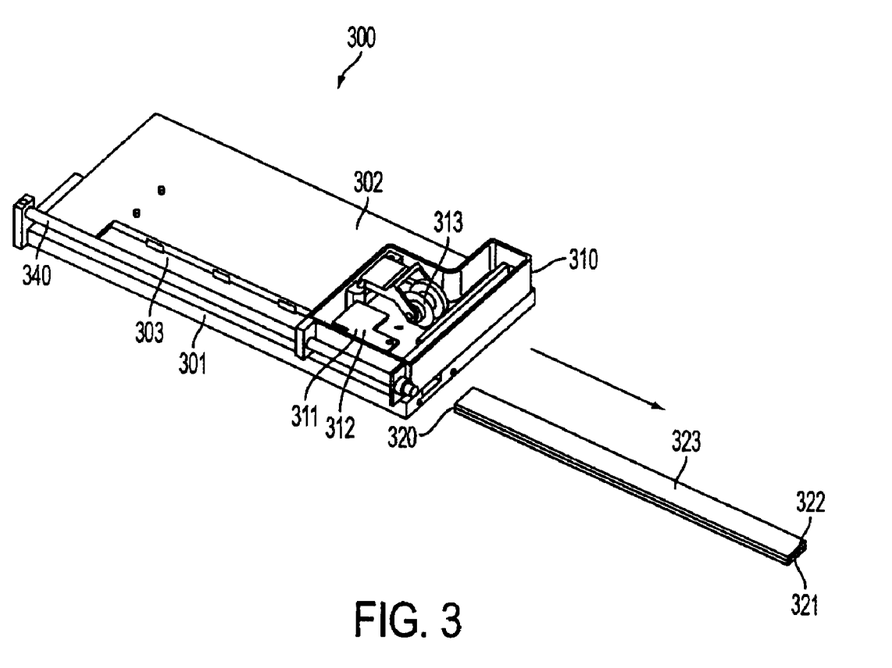
FIG. 3 shows a perspective schematic view of a document scanning system according to a possible embodiment of the present disclosure.

Referring now to FIG. 3, a static document reader 300 is shown according to a possible embodiment of the present disclosure. Specifically, FIG. 3 illustrates a perspective schematic view of the static document reader 300. The static document reader is generally a document scanning system that can be used to obtain information from a document, such as a check. The reader 300 generally includes a document bed 301 and a scanner module 310 that moves back and forth across the top of the bed 301. Preferably, the bed 301 includes a document positioning surface 302 sized to receive a document 302, such as a check. The document positioning surface 302 and/or bed 301 can be made from a high-friction material, such as a rubber or a high-friction plastic material, which assists in maintaining the position of a check or other document on the document positioning surface 302.

Preferably, the document bed 301 also includes a slot 303 arranged and configured to receive a removable presentment apparatus 320. In FIG. 3, the presentment apparatus 320 is shown removed from slot 303. The presentment apparatus includes a carrier 321, a first layer 322, and a second layer 323. The carrier 321 can be rigid and/or extruded. The carrier 321 can be made of metal or plastic.

Attached to the carrier 321 is the first layer 322, the first layer 322 can be attached to the carrier 321 by double sided tape or by other adhesive materials and/or attachment methods. Preferably, the first layer 322 is comprised of a material that has a high resistance to compression set. The first layer 322 maintains its thickness after repeatable compression. This first layer 322 can be microcellular urethane foam.

Preferably, the second layer 323 is comprised of a low friction, high wear material 323. The second layer 323 can be attached to the first layer 322 by adhesive bonding, double sided tape, or other adhesive materials and/or methods. This second layer 323 can be Ultra High Molecular Weight (UHMW) Polyethylene. Typically, the UHMW Polyethylene can be between about 0.001 and 0.10 inches in thickness, and preferably between about 0.002 and 0.004 inches in thickness.

Those having skill in the art may substitute the three distinct layers (carrier 321, first layer 322, second layer 323) with a single layer, two layers, or more than three layers of materials, which when combined achieve preferred presentment and wrap.

The presentment apparatus 320 is positioned in the slot 303 in the document bed 301. Preferably, the presentment apparatus 320 is positioned in the slot 303 by molded in features and secured by a hand screw. The presentment apparatus 320 is operator replaceable. The presentment apparatus 320 is constructed such that when it is positioned in the slot 303, a read head 311 of the scanner module 310 touches the top of the presentment apparatus 320. In use, a document, such as a check, is placed on the document positioning surface 302. The scanner module 310 passes over the document and the thickness of the document compresses the first layer 322 of the presentment apparatus 320 and deforms the document to the shape of the rigid read head 311, thus providing preferred presentment and wrap for improved read rates.

In the embodiment described, the scanner module 310 includes the read head 311, which is preferably a magnetic character reader ("MICR") read head 312, and a radial encoder 313. The MICR read head 312 reads magnetic characters printed on a check or other document. In the embodiment shown, the MICR read head 312 is arranged to pass directly over the surface of the document, compressing the first layer 322 and deforming the document around the MICR read head 312. An example of a magnetic character read by the MICR read head 312 includes the account number and routing number information printed on the front of a check or a deposit slip. Other magnetically printed information may be read by the MICR read head 312 as well. The information can be communicated from the static document reader 300 to other computing systems (not shown) by way of a communications interface, such as a network interface. Additionally, the information can be stored in a memory managed by circuitry incorporated into the scanner module 310 or interfaced thereto.

The radial encoder 313 detects the speed of movement of the scanner module 310 along the document positioning surface 302. The radial encoder 313 includes a rotating element having a plurality of discrete indicators, such as differential colors or physical characteristics, which may be detected by circuitry to detect speed of the scanner module 310 by determining the rate of rotation of the radial encoder 313. The speed of the scanner module 310 is used by the static document reader 300 to properly read magnetic characters using the MICR read head 312. Other embodiments of the document reader 300 are possible as well, in which position or speed of the scanner module 310 can be detected by way of other mechanisms beyond the radial encoder. One example of such a system is described in U.S. patent application Ser. No. 11/903,944, filed on Sep. 25, 2007, and entitled "Document Reader Including An Optical Movement Detection System", the disclosure of which is hereby incorporated by reference in its entirety.

In the embodiment shown, a slider rod 340 is mounted along an edge of the document positioning surface 302. The slider rod 340 provides a mounting location for the scanner module 310, allowing the scanner module 310 to slide along the slider rod 340 through the length of the document positioning surface 302. Although in the embodiment shown a single slider rod 340 is used, in various other embodiments additional slider rods or other mechanisms for guiding the scanner module 310 across the document positioning surface 302, including motors and actuators, may be incorporated into the document reader 300.

Figure 4:
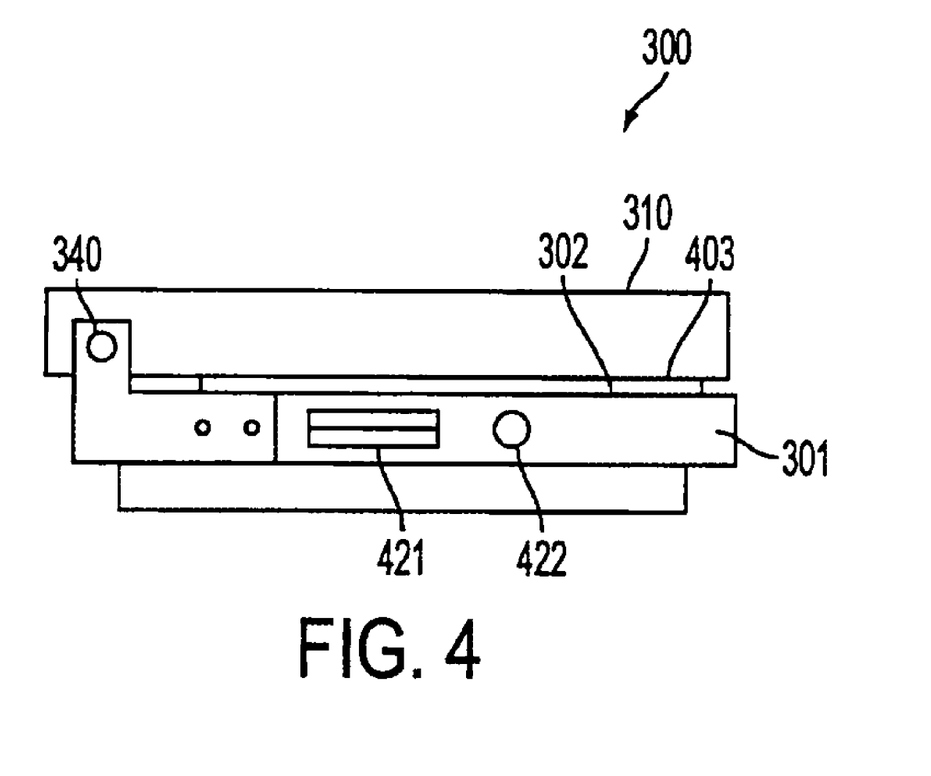
FIG. 4 is a side plan view of the document reader of FIG. 3.

FIG. 4 is a side plan view of the document reader 300 of FIG. 3, and shows the vertical layout of the various components of the document reader 300. In the system as shown, a document 403 rests on the document positioning surface 302. The scanner module 310, mounted to the document bed 301 by the slider rod 340, rests on the document 403 such that it extends across the width of the document 403. The side of the scanner module 310 is preferably a low-friction surface including the various required scanning/reading components, as previously described. The document positioning surface 302, as previously mentioned, is preferably a high-friction surface able to maintain the position of the document as the scanner module 310 passes across it to scan the images/text on the document 403.

The document reader 300 includes a communication connection 421 and a power connection 422. The communication connection 421 provides an interconnection location for connecting the document reader 300 to an external computing system, such as the computing system 118 of FIG. 1. In the embodiment shown, the communication connection 421 is a USB connection; however, other types of communication interfaces may be used, such as a serial connection, RJ-45 or other packet-based wired connection system, Bluetooth, IR, RF, or other connection systems. The power connection 422 receives a power connector, such as an AC or DC power connection configured to provide electrical power to the various scanning components of the document reader 300. Although the document reader 300 is shown as having both a communication connection 421 and power connection 422, in certain embodiments, power to the reader 300 can be supplied by the communication connection, such as in the case of a USB or Firewire connection. Other types of connections may allow for power delivery over a communications interface as well. Furthermore, in the embodiment shown, the communication connection 421 and power connection 422 are located on a side of the document bed 301; in other embodiments, the connections can be located on a different side of the bed or on a side of the scanner module 310.

Figure 5:
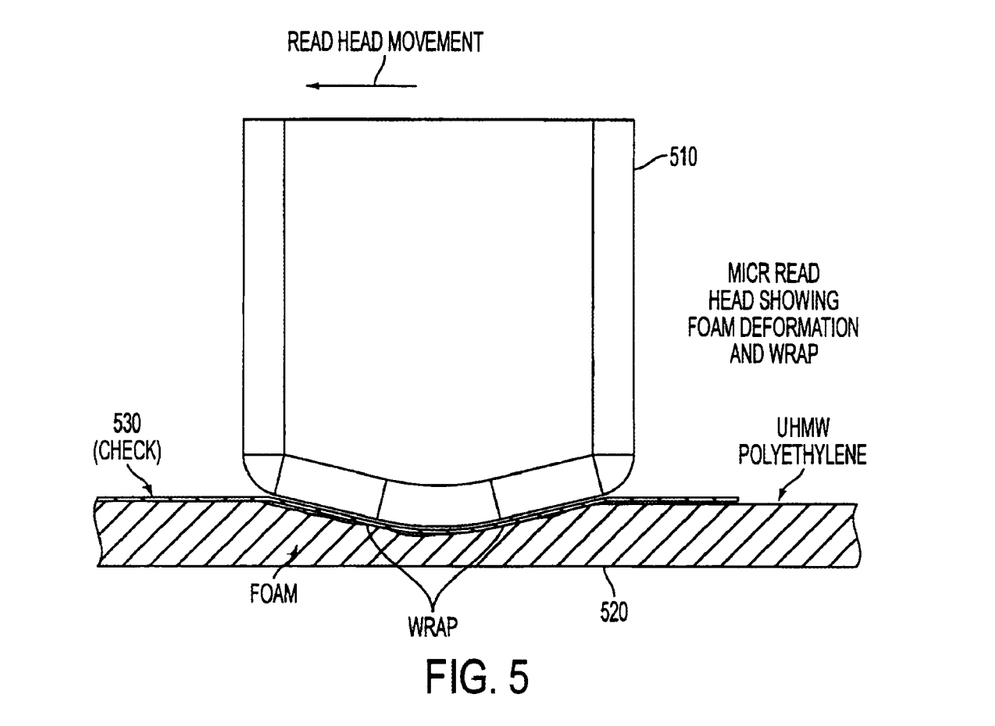
FIG. 5 is a diagram of a MICR read head compressing a document presentment apparatus, thus in accordance with a possible embodiment of the present disclosure.

FIG. 5 shows a read head 510 compressing a document presentment apparatus 520 as it moves across the surface of a document 530, thus deforming the document 530 to the shape of the read head 510. The document presentment apparatus is mounted in a document bed, such as the document bed 301 of FIG. 3, so that the bottom surface of the read head 510 is flush with the top of the presentment apparatus 520. When a document 530 is placed on the document positioning surface, such as the document positioning surface 302 of FIG. 3, the thickness of the document 530 deflects the presentment apparatus 520 and deforms the document 530 to the shape of the rigid read head 510, thus providing preferred presentment and wrap for improved read rates.

Figure 6:
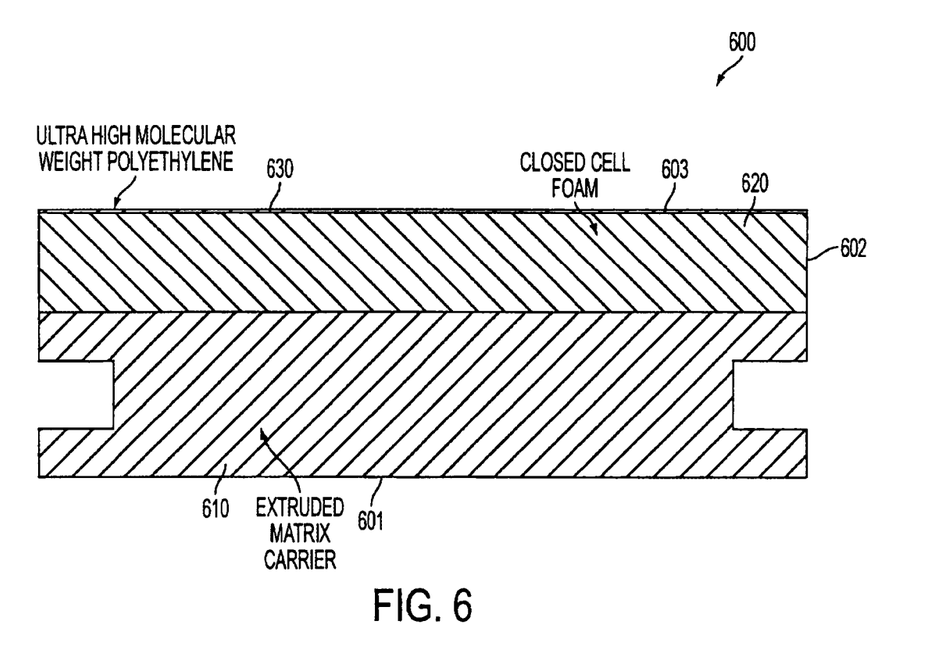
FIG. 6 is a cross sectional view of a document presentment apparatus according to a possible embodiment of the present disclosure.

FIG. 6 shows a cross sectional view of one exemplary embodiment of a document presentment apparatus 600. In the exemplary embodiment of FIG. 6, the document presentment apparatus 600 comprises a first layer 601, a second layer 602, and a third layer 603. Preferably, the first layer 601 is a carrier layer 610, which may be rigid and extruded. The carrier layer 610 may be made of metal, plastic, or another material that one skilled in the art would deem appropriate.

Attached to the top of the first layer 601 is the second layer 602. Preferably, the second layer 602 is comprised of a second material 620 having a high resistance to compression set, which maintains its thickness after repeatable compression. The second material 620 may be a microcellular urethane foam. The second layer 602 may be attached to the carrier 610 by double sided tape or other adhesive materials and/or attachment methods.

Attached to the top of the second layer 602 is the third layer 603. Preferably, the third layer 603 is comprised of a third material 630, which is a low friction, high wear material. The third material 630 may be Ultra High Molecular Weight (UHMW) Polyethylene. The third layer 603 may be attached to the second layer 602 by adhesive bonding, double sided tape, or other adhesive materials and/or attachment methods.

As the second material 620 is used repeatedly, it may began to loose its repeatable height and need to be replaced. Likewise, the third material 630 may begin to loose its qualities of low friction and high wear and require replacement after repeated use and friction. Though it is preferred that the entire document presentment apparatus 600 be replaced when necessary, it is possible that the second material 620 and/or the third material 630 be replaced by the user without replacing the carrier.

Figure 7:
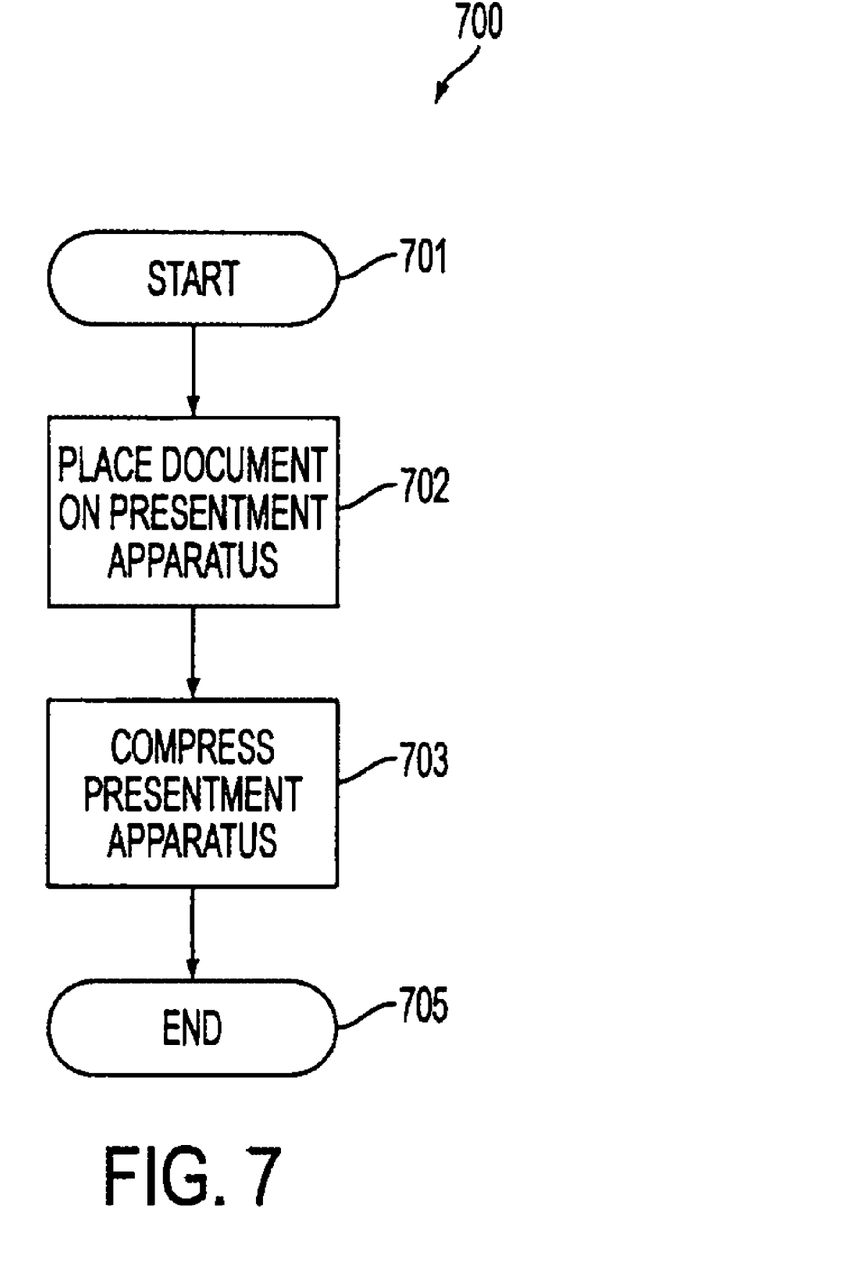
FIG. 7 is a flow diagram, outlining a method of operating a document scanner to achieve proper document wrap in accordance with a possible embodiment of the present disclosure.

FIG. 7 illustrates a method of operation 700 for a document reader, such as the document reader 300 of FIG. 3. At block 702, an operator, such as a cashier at a business, places a document, such as document 403 of FIG. 4, onto a document positioning surface, such as document positioning surface 302 of FIG. 3, so that the area of the check to be read by a read head is positioned over a presentment apparatus, such as the presentment apparatus 320 of FIG. 3. At block 703, the user compresses the presentment apparatus by moving the read head across the target area, thereby compressing the presentment apparatus. The compressed presentment apparatus deforms the document around the read head, creating a proper wrap of the document to the read head. The scanned information can be stored in a memory of the document reader, or can be communicated to an external computing system by way of any of a number of conventional communication protocols and interfaces, for communication to a financial institution. Typically, the read head will be a MICR read head and the MICR read head will read information printed with magnetic ink.

Although the document reader herein is shown as a manually operated scanning device, additional embodiments consistent with the present disclosure may incorporate an automated process. In these embodiments, the user could place a document face up on the surface of a document bed. The document could be detected by an activation sensor as it passes over the document. The activation sensor could activate the reader, which moves across the document by motors or actuators, scanning the various portions of the document it is passing by. Scanning/reading is complete at the end of the document, and the activation sensor detects the end of the document, deactivating the magnetic character reader and radial encoder. As in the manually operated use of the document reader, the scanned information can be stored in a memory of the reader, or can be communicated to an external computing system.

In other embodiments, the document bed may also include means for holding the document in place. These means may include perforations running through the document bed, from the document positioning surface toward a side of the bed opposite the surface. The perforations are of uniform size and sufficiently sized to allow passage of air therethrough without deforming checks or other documents placed on the document positioning surface. However, the perforations can be any of a variety of sizes, or may be of different sizes.

One or more fans may be mounted opposite to the document positioning surface, beneath the bed, such that perforations in the bed pass through the bed to reach the location of the fans in the region below the document. When the fans are activated and a document is placed on the bed, the fans draw the document toward the bed, ensuring that the document is securely held flat against the document bed during the scanning process. The fans are oriented to pull air from the side of the bed of the document positioning surface, through the perforations. In one specific embodiment, two fans are located on the underside of the bed. Other configurations of fans with respect to differing sized beds, surfaces, or perforations are possible as well.

The fans can be selectively activated, when a document is placed on the document positioning surface, to assist with holding the document on the surface. The fans, in combination with the perforations, create a Bernoulli effect through the perforations, with suction holding the document flat against the surface when activated. In one specific embodiment, a document sensor activates the fans. In another specific embodiment, an on/off switch activates the fans. Other specific embodiments having additional activation systems, or combinations thereof, are possible as well.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A document scanner comprising: a document bed including a surface for positioning a document and a slot in the surface for receiving a presentment apparatus that is compressible; and a scanner module arranged and configured to pass over the document bed to scan the document, including a read head; whereby as the scanner module passes over the document, the presentment apparatus compresses causing the document to wrap around the read head.

2. The document scanner of claim 1, wherein the document scanner is manually operable.

3. The document scanner of claim 1, further comprising a slider bar mounted along the length of the document bed.

4. The document scanner of claim 3, wherein the scanner module is mounted to the slider bar, the scanner module slidable along the length of the document bed.

5. The document scanner of claim 1, wherein the read head is a magnetic character reader.

6. The document scanner of claim 1, wherein the scanner module includes a radial encoder mounted within the scanner module and configured to compute the speed of movement of the scanner module.

7. The document scanner of claim 1, wherein the scanner module includes an activation sensor.

8. The document scanner of claim 1, wherein the presentment apparatus is removable.

9. The document scanner of claim 1, wherein the presentment apparatus comprises at least two layers.

10. The document scanner of claim 1, wherein the presentment apparatus is positioned in the slot by molded in features.

11. The document scanner of claim 1, wherein the presentment apparatus is secured in the slot by a screw.

12. A document bed comprising: a surface for positioning a document to be scanned, the surface having a slot for receiving a presentment apparatus; and a presentment apparatus including a first rigid layer, a second compressible layer, and a third lower friction layer.

13. The document bed of claim 12, wherein the first rigid layer is a metal.

14. The document bed of claim 12, wherein the first rigid layer is a plastic.

15. The document bed of claim 12, wherein the second compressible layer is high density, microcellular urethane foam.

16. The document bed of claim 12, wherein the third lower friction layer is Ultra High Molecular Weight Polyethylene.

17. The document bed of claim 12, wherein the third lower friction layer is Ultra High Molecular Weight Polyethylene, wherein the Ultra High Molecular Weight Polyethylene is between about 0.002 and 0.004 inches thick.

18. The document bed of claim 12, wherein the first rigid layer is attached to the second compressible layer by double sided tape.

19. The document bed of claim 12, wherein the second compressible layer is attached to the third lower friction layer with adhesive bonding.

* * * * *